(12) United States Patent
Schmeisser et al.

(10) Patent No.: US 8,109,156 B2
(45) Date of Patent: Feb. 7, 2012

(54) TORQUE SENSOR

(75) Inventors: Katy Schmeisser, Weiler (DE); Stefan Hauzenberger, Wangen (DE); Fred Bassett, Scheidegg (DE)

(73) Assignee: Liebnerr-Aerospace Lindenberg GmbH, Lindenberg/Allgaeu (DE)

( * ) Notice: Subject to any disclaimer, the term of this patent is extended or adjusted under 35 U.S.C. 154(b) by 147 days.

(21) Appl. No.: 12/384,907

(22) Filed: Apr. 10, 2009

(65) Prior Publication Data

US 2009/0293639 A1    Dec. 3, 2009

(30) Foreign Application Priority Data

Apr. 11, 2008 (DE) .................. 10 2008 018 362

(51) Int. Cl.
*G01L 3/00* (2006.01)
(52) U.S. Cl. .................................... 73/862.08
(58) Field of Classification Search ............ 73/862.08, 73/862.322
See application file for complete search history.

(56) References Cited

U.S. PATENT DOCUMENTS

| | | | |
|---|---|---|---|
| 2,219,632 A | 10/1940 | Naden | |
| 2,302,496 A | 11/1942 | Gasser | |
| 2,394,022 A | 2/1946 | Storrie | |
| 2,934,946 A | 5/1960 | Engquist | |
| 3,007,336 A | 11/1961 | Livermont | |
| 4,300,397 A * | 11/1981 | Brest van Kempen | 73/818 |
| 4,558,601 A * | 12/1985 | Stasiek et al. | 73/862.23 |
| 4,680,975 A * | 7/1987 | Dodt | 73/862.09 |
| 4,770,053 A * | 9/1988 | Broderick et al. | 73/866.5 |
| 4,864,873 A * | 9/1989 | Eto et al. | 73/862.322 |
| 5,123,279 A * | 6/1992 | Henein et al. | 73/117.02 |
| 5,247,839 A * | 9/1993 | Okutani et al. | 73/862.326 |
| 6,026,925 A * | 2/2000 | Nagao et al. | 180/444 |
| 6,854,343 B2 * | 2/2005 | Bachnak et al. | 73/862.334 |

FOREIGN PATENT DOCUMENTS

| | | |
|---|---|---|
| DE | 165347 | 11/1905 |
| DE | 170370 | 5/1906 |
| DE | 206849 | 2/1909 |
| DE | 385792 | 11/1923 |
| DE | 528929 | 7/1931 |
| DE | 529842 | 7/1931 |
| DE | 745891 | 12/1944 |
| DE | 1193697 | 5/1965 |

* cited by examiner

*Primary Examiner* — Max Noori
(74) *Attorney, Agent, or Firm* — Dilworth & Barrese, LLP.

(57) ABSTRACT

The present invention relates to a torque sensor comprising a torsion spring having first and second sides which are rotated with respect to one another by a torque applied to the torque sensor, wherein a mechanical coupling apparatus is provided between the first and second sides of the torsion spring and includes a movement element which is moved in the axial direction by a rotation of the first side with respect to the second side. In addition, a measuring apparatus is provided for the measurement of the axial movement of the movement element.

17 Claims, 2 Drawing Sheets

TORQUE SENSOR

BACKGROUND OF THE INVENTION

The present invention relates to a torque sensor, in particular to a torque sensor for the detection of the torque in the shaft train of a drive system, in particular of a high lift system in an aircraft comprising a torsion spring having first and second sides which are rotated with respect to one another by a torque applied to the torque sensor. Such a torque sensor is, for example, integrated into the drivetrain of a drive system in that the first and second sides can be connected and/or are connected to corresponding drive shafts of the drivetrain.

Previous torque sensors measure the torque using strain gages or piezostrictive sensors or magnetostrictive sensors are used. These sensors are, however, not robust enough for use over many years, in particular in aeronautics.

SUMMARY OF THE INVENTION

It is therefore the object of the present invention to provide a stable torque sensor of simple structure, in particular a torque sensor, which is robust enough for multi-year application in the aeronautical sector.

This object is satisfied by a torque sensor in accordance with the description herein. In this process, it includes a torsion spring having first and second sides which are rotated with respect to one another by a torque applied to the torque sensor. In accordance with the invention, in this process, a mechanical coupling apparatus is provided between the first and second sides of the torsion spring which includes a movement element which is moved by a rotation of the first side with respect to the second side in an axial direction. A measuring apparatus is furthermore provided for the measurement of the axial movement of the movement element. In accordance with the invention, the torsion of the torsion spring is not measured directly therewith, but rather the torsion of the torsion spring is first translated into an axial movement of the movement element which can then be measured by the measuring apparatus. A simple and stable structure of the torque sensor in accordance with the invention hereby results which nevertheless permits a reliable measurement of the torque applied to the torque sensor.

The torque transmitted by a drive shaft into which the torque sensor is integrated in this process rotates the first side of the torsion spring with respect to the second so that this rotation represents a measure for the transmitted torque. This rotation is now translated via the mechanical coupling apparatus into an axial movement of the movement element so that this axial movement likewise represents a measure for the torque transmitted via the torque sensor. The measurement of this movement of the movement element in the axial direction, that is, in a direction parallel to the axis of rotation of the torsion spring, in this respect allows a stable construction and equally a reliable measurement. It is in particular possible in this respect to make use of tested components certified in aeronautics.

In this respect, it is advantageous that the movement element is connected to the first side displaceably in the axial direction and in a torque-rigid manner in the direction of rotation and has a guide element via which it is guided at a counter-guide element connected to the second side in a torque-rigid manner in the direction of rotation. In this respect, due to the cooperation of the guide element and the counter-guide element, the rotation of the first side with respect to the second side transmitted by the first side onto the movement element and thus onto the guide element and the rotation of the first side with respect to the second side transmitted by the second side onto the counter-guide element is translated into a movement of the movement element in the axial direction. The movement element is in this respect connected to the first side in a torque-rigid manner, that is, it rotates with it and is only displaceable in the axial direction with respect to the first side in order thus to be able to be moved axially. The counter-guide element is connected to the second side in a torque-rigid manner and so rotates with it. The counter-guide element is in this respect advantageously rigidly connected to the second side and thus also not displaceable in the axial direction.

In this respect, in accordance with the invention, the measuring apparatus advantageously measures the axial movement of the movement element with respect to the counter-guide element, with the latter advantageously being rigidly connected to the second side. Since the cooperation of the guide element and the counter-guide element causes the translation of the rotation into an axial direction, the axial movement of the movement element with respect to the counter-guide element is advantageously measured, in this respect, the measuring apparatus does not have to be arranged directly between the movement element and the counter-movement element, but can rather measure the movement of the movement element with respect to a housing or to another element as long as the housing or this other element is not displaceable with respect to the counter-guide element in the axial direction. The counter-guide element is in this respect advantageously rigidly connected to the second side which is in turn advantageously immovably journaled at a housing in the axial direction so that the measuring apparatus can measure the axial movement of the movement element with respect to the counter-movement element also with respect to the housing.

The guide element and the counter-guide element advantageously form a sliding guide which translates a rotation of the first side with respect to the second side into an axial movement of the movement element. Such a sliding guide in this respect permits a simple mechanical translation of the rotation into an axial movement, with robust pans of simple construction being able to be used.

The sliding guide in this respect advantageously includes a guide pin which is guided in a guide track forming a cam on a cylinder surface, in particular a cam in the form of a helical line. In this respect, the translation ratio between the rotation of the torsion spring and the axial movement can be set via the pitch of this cam on a cylinder surface. In this respect, the guide track forming a cam on a cylinder surface is advantageously arranged at the movement element. The movement element can, for example, in this respect have a sleeve shape into which the guide track is attached in the form of an elongate groove or cut-out.

In this respect the rotation of the first side with respect to the second side is advantageously translated monotonously, in particular strictly monotonously, into an axial movement of the movement element. A rotation in the one direction of rotation hereby always effects a corresponding axial movement of the movement element in one direction and a rotation in the counter-direction accordingly effects an axial movement of the movement element in the other direction. St is thus possible to draw a reliable conclusion on a specific rotation of the torsion spring and thus on a specific torque from the position of the movement element.

The first and second sides of the torsion spring are advantageously rotatably journaled in a housing in accordance with the invention. The first and the second sides are in this respect usually integrated into a drivetrain and accordingly rotate with the drive shaft around the axis of rotation of the torsion spring, in this respect, the first and second sides of the torsion spring are advantageously connectable and/or connected to shaft sections. The journaling at the housing in this respect advantageously takes place e.g. by ball bearings or rolling element bearings.

In this respect, the movement element advantageously rotates with the first side and/or the second side of the torsion spring, with the axial movement of the movement element being transmitted via a driver onto a measuring apparatus arranged in a stationary manner, with the movement element advantageously being rotatably journaled at the driver. The movement element in particular advantageously rotates with the first side of the torsion spring with which it is advantageously displaceable in the axial direction and to which it is connected in a torque-rigid manner in the direction of rotation. The measuring apparatus is in contrast advantageously arranged in a stationary manner and does not rotate with the torsion spring so that a stable and reliable measurement is possible here. A driver is provided in this process for the transmission of the movement of the movement element onto the measuring apparatus, with the movement element advantageously being journaled rotatably, but immovably in the axial direction, so that, while the movement element can rotate with the first side and/or the second side of the torsion spring, the axial movement of the movement element is transmitted reliably to the measuring apparatus via the driver.

In this respect, the driver is advantageously guided displaceably at the housing in the axial direction. The driver is, in contrast, further advantageously guided immovably at the housing in the direction of rotation. The driver can thus only move in the axial direction so that a reliable measurement can be carried out.

The measuring apparatus in this respect advantageously measures the axial movement of the movement element with respect to the housing. For this purpose, the measuring apparatus advantageously measures the axial movement of the driver with respect to the housing. The measuring apparatus can in this respect furthermore advantageously be rigidly connected to the housing so that a stable arrangement results.

The first side and/or the second side is/are advantageously immovably journaled at the housing in the axial direction. The counter-guide element is in this respect advantageously axially immovable with respect to the housing. The measuring apparatus can hereby simply measure the axial movement of the movement element with respect to the housing in order thus to measure the movement of the movement element with respect to the counter-guide element generated by the cooperation between the guide element and the counter-guide element.

The second side is in particular advantageously immovably journaled at the housing in the axial direction for this purpose so that a counter-guide element connected rigidly to the second side is immovable with respect to the housing in the axial direction.

The torque sensor advantageously has in accordance with the invention a first hollow shaft connected to the first side and a second hollow shaft which is connected to the second side and in whose interior the torsion spring extends. The two hollow shafts in this respect rotate with the first side or the second side respectively of the torsion spring and thus advantageously form a part of the mechanical coupling apparatus which hereby has a stable and simple structure.

In this respect, the movement element is further advantageously made as a sleeve which is advantageously connected on or in the hollow shaft connected to the first side in a torque-rigid manner in the direction of rotation and is displaceable in the axial direction. A simple and stable construction hereby results for the movement element and for the mechanical coupling apparatus. The hollow shaft connected to the first side in this respect advantageously has guides which extend axially at its outer circumference or at its inner circumference and which cooperate with likewise axially extending counter-guides at the sleeve so that the sleeve rotates rigidly with the hollow shaft, but is displaceable in the axial direction.

In this respect, the guide track of the sliding guide is further advantageously arranged at the sleeve. The counter-guide element, in particular a guide pin cooperating with the guide track, is in contrast, advantageously rigidly connected to the hollow shaft connected to the second side.

The ends of the two hollow shafts in this respect further advantageously overlap in a partial region, with them advantageously sliding on one another in the direction of rotation so that the hollow shafts are guided toward one another on a rotation of the torsion spring. The movement element made as a sleeve can in this respect likewise slide on or in the hollow shaft connected to the second side, with the movement of the movement element with respect to this hollow shaft being determined by the cooperation of the guide element and of the counter-guide element.

The present invention furthermore includes a drive system, in particular for the control surfaces of an aircraft, and indeed in particular for a high lift system, comprising a torque sensor such as was described above, with the torque sensor advantageously measuring the torque transmitted from a drive shaft of the drive system. The torque sensor is in this respect in particular advantageously integrated into the drivetrain, with the torsion spring rotating with the drive shaft.

The present invention furthermore includes an aircraft comprising a drive system such was has just been described. The same advantages as have already been described with respect to the torque sensor obviously result due to the drive system and the aircraft. The torque sensor in accordance with the invention is in this respect in particular robust enough for a multi-year application in the aeronautical sector, with use being able to be made only of tested components certified in aeronautics.

BRIEF DESCRIPTION OF THE DRAWINGS

The present invention will now be described in more detail with reference to an embodiment and to drawings.

There are shown

DESCRIPTION OF THE PREFERRED EMBODIMENTS

Figure 1:
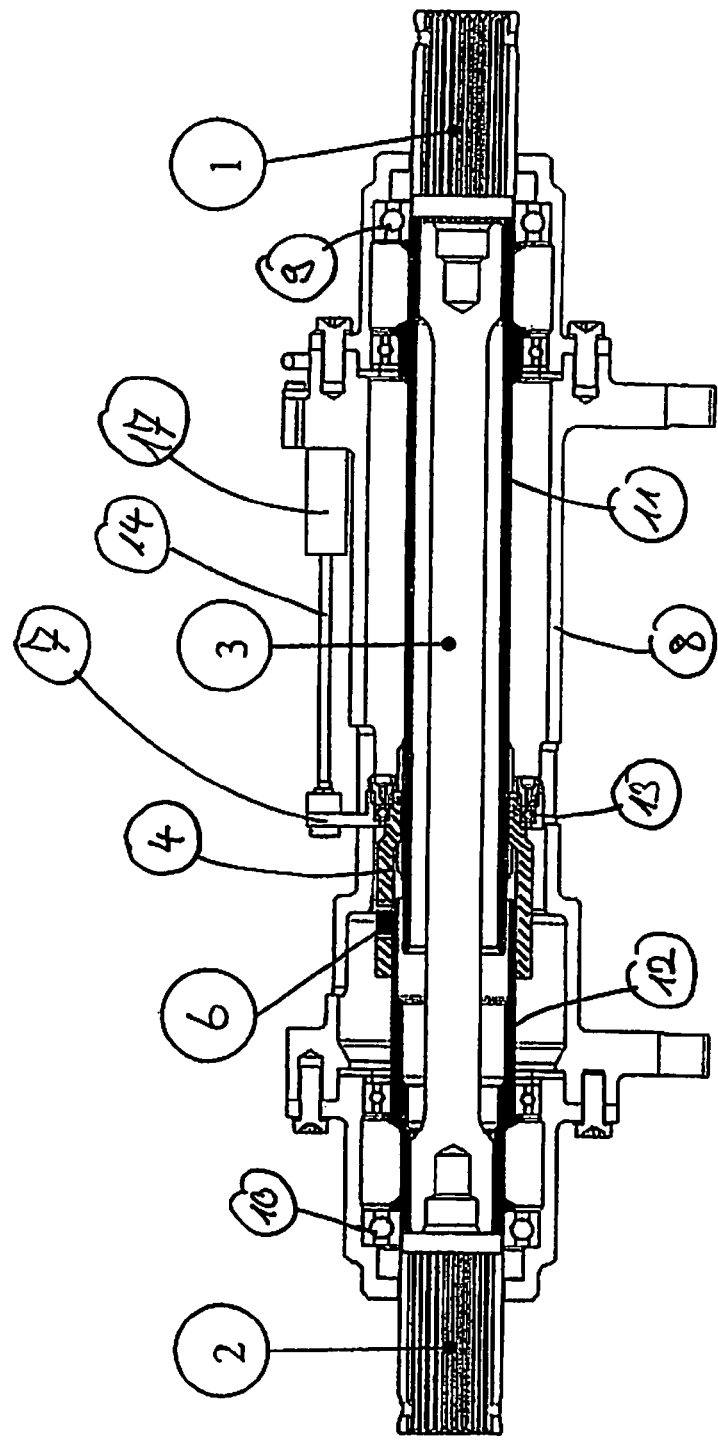
FIG. 1 a sectional view along the axis of rotation of the torsion spring of an embodiment of the torque sensor in accordance with the invention.
Figure 2:
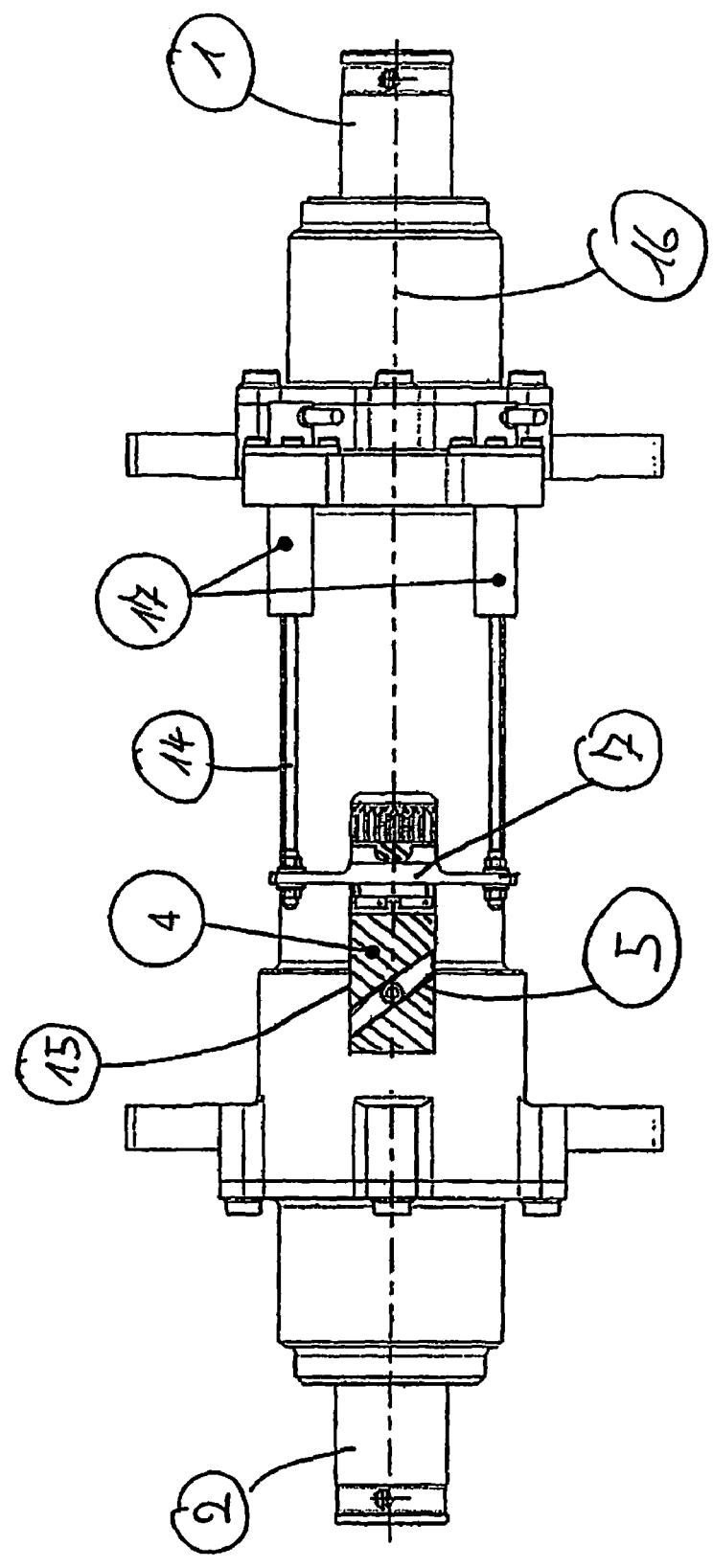
FIG. 2 a plan view of the embodiment of the torque sensor in accordance with the invention also shown in FIG. 1.

An embodiment of the torque sensor in accordance with the invention is now shown in FIGS. 1 and 2. Said torque sensor has a torsion spring 3 having a first side 1 and a second side 2, with the torsion spring 3 being rotated in itself by the torque transmitted by it so that the first side 1 rotates with respect to the second side 2 in the direction of rotation. In this respect, the torque sensor in accordance with the invention is advantageously used in a drive system, with it measuring the torque transmitted by a drive shaft of the drive system. For this purpose, the first side 1 and the second side 2 have connection regions to shaft sections of the drive system via which they can be connected in a torque-rigid manner to these shaft sections in the direction of rotation. The torsion spring 3 hereby transmits the rotation of the drive shaft and is in this respect rotated by an amount which depends on the transmitted torque.

The torque sensor in this respect has a housing 8 at which the first side 1 and the second side 2 of the torsion spring 3 are rotatably journaled. Ball bearings 9 via which the first side 1 is journaled at the housing 8 and ball bearings 10 via which the second side 2 is journaled at the housing 8 are provided for this purpose. The torsion spring hereby has an axis of rotation around which it rotates and around which the rotation of the first side 1 with respect to the second side 2 also takes place.

In accordance with the invention, a coupling apparatus is now provided between the first side 1 and the second side 2 of the torsion spring 3 and includes the movement element 4. The movement element 4 is in this respect moved by the rotation of the first side 1 with respect to the second side 2 in the axial direction, with this axial movement of the movement element 4 being measured via the measuring apparatus 17. In accordance with the invention, the torsion spring is in this respect first rotated in dependence on the transmitted torque; this rotation of the first side with respect to the second side is converted via a mechanical coupling apparatus into an axial movement of the movement element 4 in a direction parallel to the axis of rotation of the torsion spring 3; and finally this axial movement is measured via the measuring apparatus so that the transmitted torque is measured by the determination of the axial movement of the movement element.

The mechanical coupling apparatus between the first and second sides of the torsion spring in this respect includes in accordance with the invention the hollow shaft 11 rigidly connected to the first side 1 as well as the hollow shaft 12 rigidly connected to the second side 2, which are arranged coaxially to the torsion spring and in whose interiors said torsion spring extends. The hollow shaft 11 accordingly rotates with the first side 1; the hollow shaft 12 with the second side 2 of the torsion spring. In this respect the journaling of the first side 1 takes place via this hollow shaft in the embodiment, as does the journaling of the second side 2. The movement element 4 is in this respect connected to the hollow shaft 11 displaceably in the axial direction and in a torque-rigid manner in the direction of rotation so that it is accordingly connected axially displaceably to the first side 1 and in a torque-rigid manner in the direction of rotation. Accordingly, the movement element 4 rotates with the first side 1, but is displaceable with respect to the first side 1 in the axial direction. In the embodiment, the movement element 4 is in this respect formed as a sleeve which is arranged axially displaceably at the outer side of the hollow shaft 11, for which purpose axially extending guide elements are provided at the outer side of the hollow shaft 11 which cooperate with axially extending counter-guide elements arranged at the inner side of the movement element 4 made as a sleeve and so effect the axial displaceability with a connection which is torque-rigid in the direction of rotation. In this respect, a tongue and groove arrangement extending in the axial direction is in particular provided.

The hollow shaft 11 and the hollow shaft 12 overlap in an end region in this respect, with them sliding on one another in the direction of rotation on a rotation of the first side with respect to the second side so that a stable construction results here.

The mechanical translation of the rotation of the first side with respect to the second side is in this respect effected by the cooperation of a guide element 5 arranged at the movement element 4 and of a counter-guide element 6 arranged at the hollow shaft 12, with the counter-guide element 6 being rigidly connected to the hollow shaft 12. The guide element 5 and the counter-guide element 6 is in this respect form a sliding guide, with the guide element 5 being made as a guide track in which the counter-guide element 6 is guided which is made as a guide pin. As can easily be recognized in FIG. 2, the guide track 5 in this respect forms a cam on a cylinder surface, with the cylinder surface being formed by the movement element 4 shaped as a sleeve and the guide track being shaped as an elongate cut-out in this sleeve. The rotation of the first side with respect to the second side or the rotation of the movement element 4 with respect to the counter-guide element 6, and thus the second side, is translated by the pitch of this track into an axial movement of the movement element 4 with respect to the counter-guide element 6. This axial movement is in this respect translated by the corresponding shaping of the guide track, in particular in the form of a helical line, strictly monotonously into an axial movement of the movement element. This axial movement of the movement element is then measured via the measuring apparatus 17.

A driver 7 is provided for this purpose at which the movement element is journaled rotatably, but axially immovably, so that the axial movement of the movement element 4 is transmitted onto the drive 7, but not the rotational movement. The driver 7 is in this respect guided at the housing in the axial direction, is accordingly connected axially displaceably and non-rotatably to the housing. As can in particular be seen from FIG. 2, an elongate cut-out is provided in the housing along the axis of rotation 16 in the embodiment by which a part of the driver 7 is guided outwardly from the inner space of the housing and whereby the driver is axially guided at the housing.

The measuring apparatus 6 to which the axial movement of the movement element 4 is transmitted via the driver and the rods 14 accordingly measure the axial movement of the movement element 4 with respect to the housing 8. The measuring apparatus 17 is in this respect connected to the housing 8. In this respect, the second side 2 is furthermore journaled immovably at the housing in the axial direction so that the relative axial movement measured by the measuring apparatus 17 between the movement element 4 and the housing 8 corresponds to the relative axial movement of the movement element 4 with respect to the counter-guide element 6. The first side 1 is also journaled substantially immovably at the housing in the axial direction.

The movement element 4 made as a sleeve slides in this respect in accordance with the invention on the hollow shaft 12 so that the rotation and axial, displacement between the hollow shaft 12 and the movement element 4 which are determined by the cooperation of the guide element 5 and of the counter-guide element 6 are stabilized, in this respect, a structure results in the embodiment of the outwardly extending movement element 4, of the hollow shaft 12 arranged within the movement element 4 and of the hollow shaft 11 again arranged within the hollow shaft 12 in an overlap region. A stable construction hereby results which is not destabilized by the rotation of the torsion spring, with the transmitted torque being able to be measured easily and reliably via the axial displacement of the movement element 4. The movement element 4 in this respect rotates with the torsion spring, while its axial movement is transmitted via the driver 7 to the measuring apparatus 17, for which purpose the movement element 4 is journaled axially immovably, but rotatably, via the ball bearing 13 at the driver 7.

In accordance with the invention, it is thus possible to make use of simple and proven mechanical components in order thus to provide a robust torque sensor which can also be used for a multi-year application in the aeronautical sector. The torque sensor in accordance with the invention can in this respect in particular be used for the detection of the torque in the shaft train of a high lift system of an aircraft.

The invention claimed is:

1. A torque sensor comprising
a torsion spring having first and second sides which are rotated with respect to one another by a torque applied to the torque sensor,
a mechanical coupling apparatus between the first and second sides of the torsion spring which includes a movement element which is moved by a rotation of the first side with respect to the second side in the axial direction, and
a measuring apparatus for the measurement of the axial movement of the movement element, wherein
the sliding guide includes a guide pin which is guided in a guide track forming a cam on a cylinder surface.

2. A torque sensor in accordance with claim 1, wherein the movement element is connected to the first side displaceably in the axial direction and in a torque-rigid manner in the direction of rotation and has a guide element via which it is guided at a counter-guide element connected to the second side in a torque-rigid manner in the direction of rotation.

3. A torque sensor in accordance with claim 2, wherein the measuring apparatus measures the axial movement of the movement element with respect to the counter-guide element, with the latter advantageously being rigidly connected to the second side.

4. A torque sensor in accordance with claim 2, wherein the guide element and the counter-guide element form a sliding guide which converts a rotation of the first side with respect to the second side into anaxial movement of the movement element.

5. A torque sensor in accordance with claim 1, wherein the cam is in the form of a helical line.

6. A torque sensor in accordance with claim 1, wherein a rotation of the first side with respect to the second side is translated monotonously into an axial movement of the movement element.

7. A torque sensor in accordance claim 1, wherein the first and second sides of the torsion spring are rotatably journaled in a housing.

8. A torque sensor in accordance with claim 1, wherein a rotation of the first side with respect to the second side is translated monotonously into an axial movement of the movement element.

9. A torque sensor in accordance claim 8, wherein the first and second sides of the torsion spring are rotatably journaled in a housing.

10. A torque sensor comprising
a torsion spring having first and second sides which are rotated with respect to one another by a torque applied to the torque sensor,
a mechanical coupling apparatus between the first and second sides of the torsion spring which includes a movement element which is moved by a rotation of the first side with respect to the second side in the axial direction, and
a measuring apparatus for the measurement of the axial movement of the movement element, wherein
the first and second sides of the torsion spring are rotatably journaled in a housing, and
(a) the movement element rotates with at least one of the first side and the second side of the torsion spring and the axial movement of the movement element is transmitted via a driver onto the measuring apparatus arranged in a stationary manner, with the movement element being rotatably journaled at the driver; or
(b) the measuring apparatus measures the axial movement of the movement element with respect to the housing; or
(c) at least one of the first side and the second side is journaled immovably at the housing in the axial direction.

11. A torque sensor in accordance with claim 10, having a first hollow shaft connected to the first side and having a second hollow shaft connected to the second side in whose interiors the torsion spring extends.

12. A torque sensor in accordance with claim 10, wherein the movement element is made as a sleeve which is displaceable in the axial direction on or in a hollow shaft connected to the first side in a torque-rigid manner in the direction of rotation.

13. A drive system, in particular for the control surfaces of an aircraft, comprising a torque sensor in accordance with claim 10 wherein the torque sensor measures the torque transmitted by a drive shaft of the drive system.

14. An aircraft comprising a drive system in accordance with claim 13.

15. A torque sensor comprising
a torsion spring having first and second sides which are rotated with respect to one another by a torque applied to the torque sensor,
a mechanical coupling apparatus between the first and second sides of the torsion spring which includes a movement element which is moved by a rotation of the first side with respect to the second side in the axial direction; and
a measuring apparatus for the measurement of the axial movement of the movement element, wherein
the movement element is connected to the first side displaceably in the axial direction and in a torque-rigid manner in the direction of rotation and has a guide element via which it is guided at a counter-guide element connected to the second side in a torque-rigid manner in the direction of rotation, and
the first and second sides of the torsion spring are rotatably journaled in a housing and the counter-guide element is axially immovable with respect to the housing.

16. A torque sensor in accordance with claim 15, wherein the counter-guide element is rigidly connected to the second side journaled axially immovably at the housing.

17. A torque sensor comprising
a torsion spring having first and second sides which are rotated with respect to one another by a torque applied to the torque sensor,
a mechanical coupling apparatus between the first and second sides of the torsion spring which includes a movement element which is moved by a rotation of the first side with respect to the second side in the axial direction,
a measuring apparatus for the measurement of the axial movement of the movement element and physically-coupled to the movement element, and
a first hollow shaft connected to the first side and a second hollow shaft connected to the second side in whose interiors the torsion spring extends, wherein
said first and second hollow shafts overlap in an axial end region such that said shafts slide on one another in direction of rotation on rotation of the first side with respect to the second side.

* * * * *